US006875384B1

(12) United States Patent
Whitney (10) Patent No.: US 6,875,384 B1
(45) Date of Patent: Apr. 5, 2005

(54) PRECISION ARTICLE MOLDING METHODS AND APPARATUS

(75) Inventor: David W. Whitney, Santa Rosa, CA (US)

(73) Assignee: Triformix, Inc.

( * ) Notice: Subject to any disclaimer, the term of this patent is extended or adjusted under 35 U.S.C. 154(b) by 237 days.

(21) Appl. No.: 10/236,509

(22) Filed: Sep. 6, 2002

(51) Int. Cl.[7] .............................................. B29C 45/36
(52) U.S. Cl. ...................... 264/40.5; 425/150; 425/577
(58) Field of Search ................. 264/40.5, 2.2, 264/328.7; 425/150, 577, 808

(56) References Cited

U.S. PATENT DOCUMENTS

| | | | | |
|---|---|---|---|---|
| 4,561,776 A | * | 12/1985 | Pryor | ........................... 356/72 |
| 4,649,616 A | * | 3/1987 | Bricker et al. | ................. 29/406 |
| 5,127,820 A | * | 7/1992 | Briggs et al. | ................ 425/577 |
| 5,512,221 A | | 4/1996 | Maus et al. | |
| 5,792,392 A | | 8/1998 | Maus et al. | |
| 6,156,242 A | * | 12/2000 | Saito et al. | ................... 264/2.2 |
| 6,695,996 B2 | * | 2/2004 | Chou | ......................... 264/40.5 |

FOREIGN PATENT DOCUMENTS

JP          61-066623        4/1986

* cited by examiner

*Primary Examiner*—Jill L. Heitbrink
(74) *Attorney, Agent, or Firm*—David B. Harrison (57) ABSTRACT

An improved molding apparatus and method includes an adjustable mold component and a fixed mold component for molding precision articles; a bias force mechanism for applying a bias force to the adjustable mold component; and an adjustable mold component fine position adjustment mechanism operable exteriorly of the mold for applying a position adjustment force to the adjustable mold component to overcome the bias force and thereby adjust position of the adjustable mold component relative to a fixed mold component to reduce positional offset in a range of ±ten microns, or less, in at least one adjustment dimension. In one aspect, a plurality of bias force mechanisms and adjustment mechanisms provide positional adjustment in a plurality of adjustment dimensions. In another aspect, a feedback control loop responsive to optically sensed positional error automatically reduces positional offset.

39 Claims, 6 Drawing Sheets

PRECISION ARTICLE MOLDING METHODS AND APPARATUS

FIELD OF THE INVENTION

The present invention relates to improved methods and apparatus for injection molding of articles having micron-range precision.

BACKGROUND OF THE INVENTION

The true position accuracy of mechanical features of a molded article is determined by accuracy of associated features of a mold used to produce the article. The true position accuracy of the mold features is, in turn, determined by the accuracy of fabrication of the mold components, the accumulation or stack-up of tolerances of the various components comprising the mold, the clearance gaps required to enable the mold to be assembled and disassembled, the clearance gaps required to enable moving parts of the mold to move freely, the accuracy with which the two halves of the mold are positioned relative to each other, the movement of the mold components that results from forces imparted to the mold during the molding process, the deformations of the mold resulting from forces imparted to the mold during the molding process, and changes that occur to mold components as a result of wear and tear over the useful service life of the mold. The tolerance limits to the true position accuracy of features of the molded article, which result from the sum of the foregoing factors, determine the suitability or ability of a particular molding process to produce a particular article capable of satisfying specified fit and function requirements. These limitations apply across the entire range of molding technology including injection molding, compression molding, transfer molding, ceramic molding, metal molding, sintering, or glass molding, for example.

There is a continuing need to produce molded parts with accuracy requirements exceeding the cumulative accuracy permitted by the limiting factors set forth above. As mold fabrication techniques have improved, the tolerances achievable via molding processes have accordingly improved, enabling manufacture of molded articles having accuracies previously not achievable. However, there are inherent limits to what can be achieved by improving the precision in execution of conventional molding techniques and with conventional mold tooling architectures.

Molded subassemblies are rapidly displacing subassemblies formed out of discrete components. For example, conventional optical subassemblies used in fiber optic transceivers typically have multiple structural elements including expensive discrete glass lens arrays. Requirements of individual component costs and manual assembly cause such subassemblies to be relatively very expensive, currently on the order of about $40.00 per completed subassembly. The assignee of the present invention has developed injection molding processes which enable production of one-piece molded polymeric optical components for use in fiber optic transceivers at much lower unit costs, currently on the order of about $4.00 per completed component. Precision molded optical subassemblies formed of optical grade thermoplastic polymers find practical use not only in fiber optic transceivers but also in fiber optic connectors, cameras in cell phones and the like, sensors in printers and scanners, and biomedical devices, for example.

A typical injection molding process includes steps of bringing two complementary mold halves holding die inserts with features defining an article to be molded into a close facing proximity, injecting e.g., a thermally plasticized polymer material as an amorphous mass into a molding volume or space between the die halves; applying sufficient pressure to the plasticized polymer to cause it to conform to the features of the molding volume defined by the die halves; allowing the material to cool in the mold to cause the material to resume a solid phase ("freeze"); moving the die halves apart; and, removing the molded article. The molding process cycle may then be repeated. Evidently, there are many tolerances associated with injection molding, particularly with regard to maintaining accuracy of alignment of the moving die half relative to the fixed die half. Mechanical alignment tolerances include three positional dimensions (x, y and z), as well as rotational and tilt dimensions. Mold tolerances are additionally affected by changes in temperatures and pressures associated with the molding process as well as mechanical clearances and wear, as noted above.

Molding machines typically include massive frames and guiding structures and features, as well as temperature and pressure control systems, in order to regulate, control and hopefully minimize molding process tolerances. Yet, as dimensional requirements for molded articles approach the micron range, the conventional techniques for controlling tolerances have proven inadequate. Control of molding dimensions to a tolerance of about ±one micron has heretofore proven illusive, if not practically impossible. Yet such tolerance is needed in order to provide molded optical components for plural-lens single-mode optical fiber applications, for example.

Figure 1:
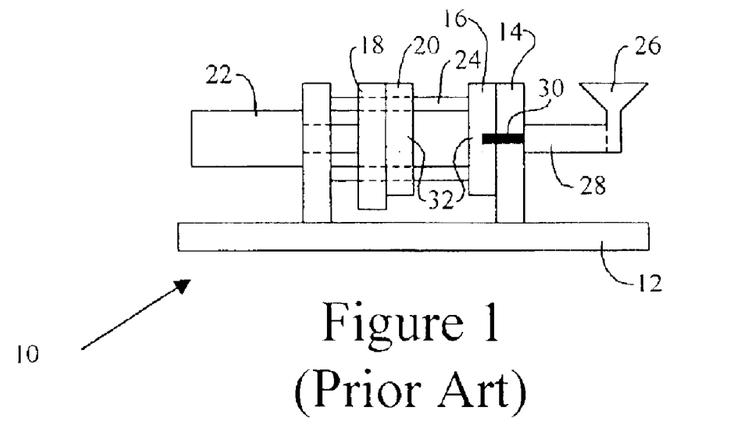
FIG. 1 is a highly diagrammatic view in side elevation of a molding machine having a two-part mold set for molding precision optical components and the like in accordance with the prior art.

Various tolerances associated with thermoplastic injection molding may be understood by considering the molding environment. FIG. 1 illustrates a conventional thermoplastic injection molding machine 10 that is fitted with a conventional mold. At a high level the molding machine 10 essentially includes a massive base or frame 12, a fixed platen 14 directly secured to the base 12, a fixed mold-half 16 secured to the fixed platen 14, a moveable platen 18, a moveable mold-half 20 secured to the moveable platen 18, a platen actuator 22 secured to the base 12 for moving the moveable platen 18 toward and away from the fixed platen 14 along leader pins 24, a hopper 26 for holding a supply of thermoplastic pellets, a plasticizer-injector 28 for plasticizing a quantity of thermoplastic pellets and for injecting a plastic-state amorphous mass via a conduit 30 through the fixed platen 14 and fixed mold-half 16 and into a molding volume 32 defined when the moveable mold-half 20 is forced to close against the fixed mold-half 16 by the actuator 22. Force equivalent to 20 to 250 tons, more or less depending upon the molding machine, may be exerted by the actuator 22 against the moveable platen 18 and moveable mold-half 20 during the mold-closing operation. FIG. 1 illustrates the molding machine in a mold-open position. Details such as heating/cooling supplies and conduits, automatic picker-gripper tooling for engaging and removing each molded article from the mold following molding, and mold machine controls, are not shown in FIG. 1 but would be present in practical embodiments of automatic molding apparatus, as is well understood by those skilled in the art.

Figure 2:
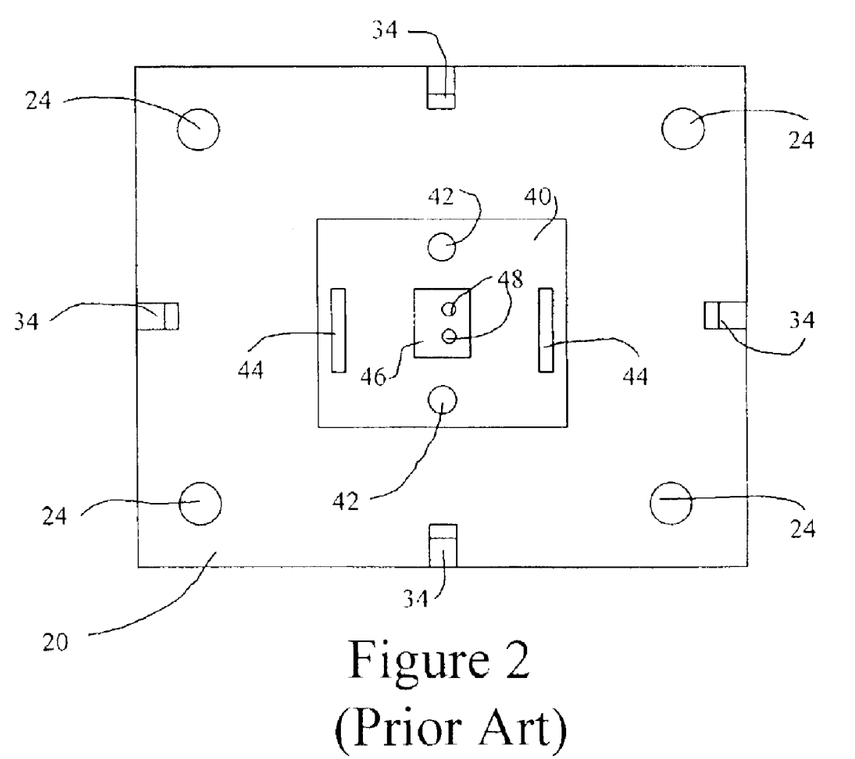
FIG. 2 is a view in elevation of one-half of the FIG. 1 mold set for molding precision optical components in accordance with the prior art.

FIG. 2 illustrates a mold-half 20 for molding thermoplastic precision optical lens arrays in accordance with the prior art. This conventional mold-half 20 includes a number of alignment features and components. To begin with, the leader pins 24 guide the moveable mold-half 20 relative to the fixed mold-half 16 with a tolerance of ±75 microns due to lubricant thicknesses, etc. Zero-degree interlocks 34 engage complementary features of the fixed-mold half 16 and reduce relative positional tolerance between mold halves to about ±12 microns. A cavity block 40 is mounted to each mold half. According to current industry practice, locational precision of the cavity block 40 relative to the mold-half 20 is established by a precision fit with sufficient tolerances or gaps to enable insertion and removal of the block 40 from the mold-half cavity.

Cavity-block zero-degree interlock pins 42 register the cavity blocks together at mold closure with a tolerance of about ±12 microns. Angled taper locks 44 projecting from the moveable cavity block 40 mate with complementary angled recesses of the fixed cavity block (not shown in FIG. 2) and reduce closure tolerance to about ±3 microns, establishing the smallest molding tolerance achievable with contemporary molding techniques of the prior art. A mold insert 46 defining structural features to be formed in the molded article is precisely fitted into an opening of the cavity block 40 and locked in place. The positional accuracy of the mold insert 46 relative to the cavity block 40 is limited by the precision of fit achievable in the particular molding operation. In the present example of a molded component with two precision optical lens surfaces, diamond-ground precision optical lens pins 48 are installed in the mold insert with a precision limited by the particular fit.

In order to form a precision optical lens molded article in accordance with conventional practice, the mold halves 16 and 20 are assembled and installed on the molding machine 10. A test article is then molded and removed from the machine and carefully measured under a microscope, magnifying optical comparator, or other suitable tolerance measuring apparatus or device to determine dimensional errors and tolerances. Correction calculations are then carried out based on measured errors. At least one of the mold halves 16 and 20 is then removed from the machine, disassembled, dimensionally adjusted to reduce the measured errors in the test article and reassembled. Dimensional adjustments may be carried out by machining to remove mold material and/or plating or other deposition to build up mold material. The testing/adjustment process is repeated until an article is molded having acceptable dimensional/optical tolerances and qualities. Obviously, this mold setup procedure is very time consuming. Additionally, during a production run, molded articles are selected and manually checked to be sure that the molding process remains within tolerance. If articles are found to be out of tolerance, production is stopped and another setup procedure of the type described above is undertaken to correct the out-of-tolerance condition. Also, even though the mold halves 16 and 20 are regulated at precise temperatures and pressures during the molding process, control of molding tolerance at a ±one micron level of accuracy of the molded precision article has not been possible with contemporary techniques.

The prior art suggests several techniques for adjusting mold dimensions without requiring removal, disassembly, reassembly and reinstallation of a mold set. In U.S. Pat. No. 5,512,221 to Maus et al., entitled "Lens Thickness Adjustment Method and Apparatus in a Thermoplastic Injection Mold for Opthalmic Finished Spectacle Lenses" a wedge block operated by a manually rotated adjustment knob external to the mold provided a mold-half and mold cavity adjustment to change molded spectacle lens thickness without requiring disassembly of the mold. A slightly different approach using a worm gear mechanism in lieu of a wedge block to change molded spectacle lens thickness is described in U.S. Pat. No. 5,792,392 to Maus et al., entitled: "Lens Thickness Adjustment in Plastic Injection Mold". These patents concerned controlling spectacle lens thicknesses in the millimeter range, as opposed to the micron range, and as described would not provide sufficiently accurate mold tolerance control to achieve tolerance control in the ±one micron range, due to mechanical tolerances and hysteresis associated with the mechanical components employed in the teachings of these patents to alter the mold thickness.

When thermoplastic material changes from a thermoplastic state to a solid state at the end of the molding process, the material typically shrinks slightly. A variety of techniques are known in the art to compensate for shrinkage. One approach is described in Japanese Published Patent Application 61-66623 published on May 4, 1986. This approach measures mold volume indirectly with a variable resistance sensor coupled between the fixed and moveable mold halves and automatically controls mold cavity dimension to achieve a predetermined article thickness. Again, this approach does not appear to describe a molding process having sufficient accuracy to achieve molding tolerance control in the ±one micron range.

Active alignment techniques are employed in the optical fiber splicing art in order to maximize light transmission at a fiber splice. In the active technique, light energy is launched into one fiber and its amplitude is measured through the other fiber. The fiber ends are automatically manipulated and spatially/axially adjusted in a manner to produce maximum transmission of light energy thereby denoting axial alignment of the ends. Then, the abutting fiber ends can be joined together by welding or bonding. While active alignment techniques have been employed in optical fiber splicing, they have not heretofore been applied to control mold alignment in a molding process for molding precision articles and components in order to achieve accuracy in the micron range.

A hitherto unsolved need has arisen to provide methods and apparatus enabling precision molding of thermoplastic optical articles having dimensional tolerances controlled to an approximate ±one micron range of accuracy.

SUMMARY OF THE INVENTION WITH OBJECTS

A general object of the present invention is to provide methods and apparatus for injection molding precision articles with micron-range molding accuracy in a manner overcoming limitations and drawbacks of the prior art.

Another object of the present invention is to provide methods and apparatus for sensing and correcting positional offset inaccuracies in precision molding of articles in a manner overcoming limitations and drawbacks of the prior art.

Another object of the present invention is provide methods and apparatus for injection molding precision articles defining plural spatially-offset features with micron-range molding accuracy in a manner overcoming limitations and drawbacks of the prior art.

In accordance with principles of the present invention an improved injection molding apparatus is provided for precision molding articles of thermoplastic material, for example. The molding apparatus typically includes a molding assembly having a moveable mold part and a fixed mold part, a force imparting mechanism for forcing the moveable mold part against the fixed mold part during a molding cycle and for thereafter retracting the moveable mold part from the fixed mold part, and an injection system for injecting thermoplastic material during the molding cycle into a precision molding cavity defined by adjacent faces of the moveable mold part and the fixed mold part of the molding assembly. The improvement includes an adjustable mold component and a fixed mold component, for molding the precision articles; a bias force mechanism for applying a bias force to the adjustable mold component; and an adjustable mold component fine position adjustment mechanism operable exteriorly of the mold for applying a position adjustment force to the adjustable mold component to overcome the bias force and thereby adjust position of the adjustable mold component relative to a fixed mold component to reduce positional offset in a range of ±ten microns, or less, in at least one adjustment dimension. In one preferred aspect, the improvement provides a plurality of bias force mechanisms and adjustment mechanisms enabling positional adjustment in a plurality of adjustment dimensions. Manual operation of the positional adjustment mechanism, and/or automatic adjustment of the positional adjustment in a feedback control loop, is provided. In this regard, one or more position sensors, such as optical position sensors, are provided to sense positional offsets of the adjustable mold component relative to the fixed mold component. Further, electromechanical actuators such as rotary or linear electric motors, piezoelectric actuators, bi-metal actuators, or other known electromechanical force providing elements, may be used to implement the position adjustment mechanism. A feedback control loop including a controller connected to the positional offset sensors and to the electromechanical fine position adjustment devices receives the offset information, determines and applies position correction values to the electromechanical fine position adjustment motors or devices in order to reduce sensed positional offset. The fine position adjustment mechanism may be manually operable, and in the form of a micrometer. The bias force may be provided by metal springs, other elastic or resilient elements or materials, or by a displaceable stop.

A method for improving positional accuracy of a moveable mold component relative to a fixed mold component of precision article molding apparatus, comprises steps of:
 a. sensing alignment of the moveable mold component relative to the fixed mold component to produce a positional offset value, and
 b. positionally displacing one of the moveable and fixed mold components by applying a displacement force with an adjustment mechanism against a bias force of the molding apparatus without disassembly of the mold components to reduce the positional offset value in a range of 10 microns or less.

These and other objects, advantages, aspects and features of the present invention will be more fully understood and appreciated upon consideration of the detailed description of preferred embodiments presented in conjunction with the following drawings.

DETAILED DESCRIPTION OF PREFERRED EMBODIMENTS

Figure 3:
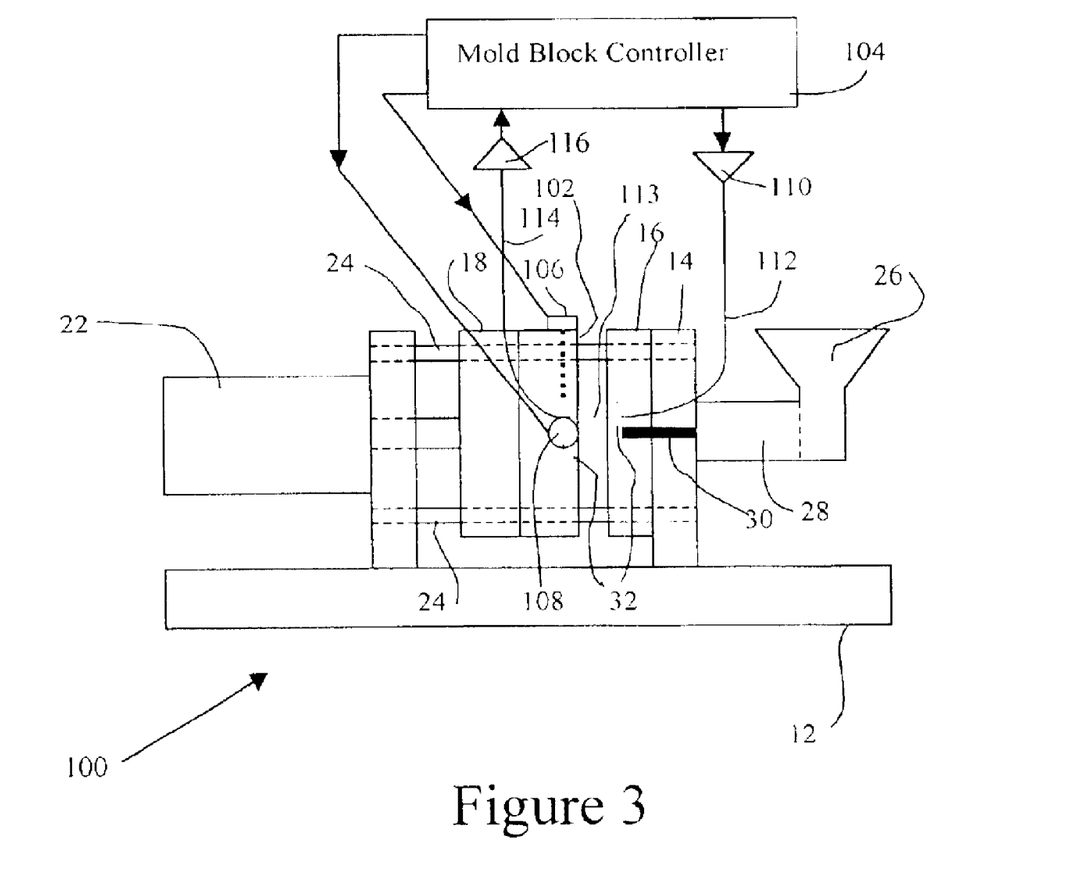
FIG. 3 is a highly diagrammatic view in side elevation of a molding machine of the FIG. 1 type having a two-part mold set for molding precision articles, components and the like in accordance with principles of the present invention.

With reference to FIG. 3, a molding machine 100 of the FIG. 1 type has been improved for molding precision optical components and the like in accordance with principles of the present invention. In the FIG. 3 embodiment 100 structural elements and features which remain essentially the same as described in connection with the molding machine 10 depicted in FIG. 1 bear the same reference numerals, and the descriptions provided above apply to these structural elements as well.

The mold half 16 of the machine 10 has been replaced with an improved mold half 102 in the machine 100. A mold block controller 104, preferably a programmed digital controller of a type well understood by those skilled in the art of automatic machine tool control, receives information representing sensed position of the cavity blocks, automatically calculates positional offset correction values, and applies those values through a y-dimension electromechanical micro-actuator 106 and an x-dimension micro-actuator 108 to reposition at least one of the cavity blocks relative to the other, in order to reduce offset tolerance to the ±one micron range. Sensing of cavity block relative position may be carried out in a variety of ways and with a variety of known position sensing technologies. In the molding machine 100 shown in FIG. 3 position sensing is carried out optically. An electro-optical transmitter 100 injects light, such as highly collimated laser light, into an optical fiber 112 which leads to an alignment office of the cavity block located in the fixed mold half 16. A light beam 113 passes through the alignment orifice and is directed toward an alignment orifice 126 (see FIG. 4) of the adjustable cavity block of the moveable mold half 102. Therein, another optical fiber 114 receives a component of the light beam 113 and presents that component to an opto-electronic detector 116. In accordance with known automatic fiber positioning techniques practiced in the optical fiber splicing art, the mold block controller 104 manipulates the position of the moveable cavity block with actuators 106 and 108 in the moving mold half 102 in order to bring about alignment of the cavity blocks by sensing maximized optical intensity at the opto-electronic detector 116.

In the molding machine 100 of FIG. 3, the adjustable cavity block is shown to be included as part of the moveable mold half 102. The adjustable cavity block could be provided in the fixed mold half 16 with equally satisfactory results. Importantly, in accordance with principles of the present invention, one cavity block of the pair thereof is adjustable positionally in the ±one micron range relative to the other one of the pair without requiring disassembly, dimensional adjustment and reassembly of a mold half.

Figure 4:
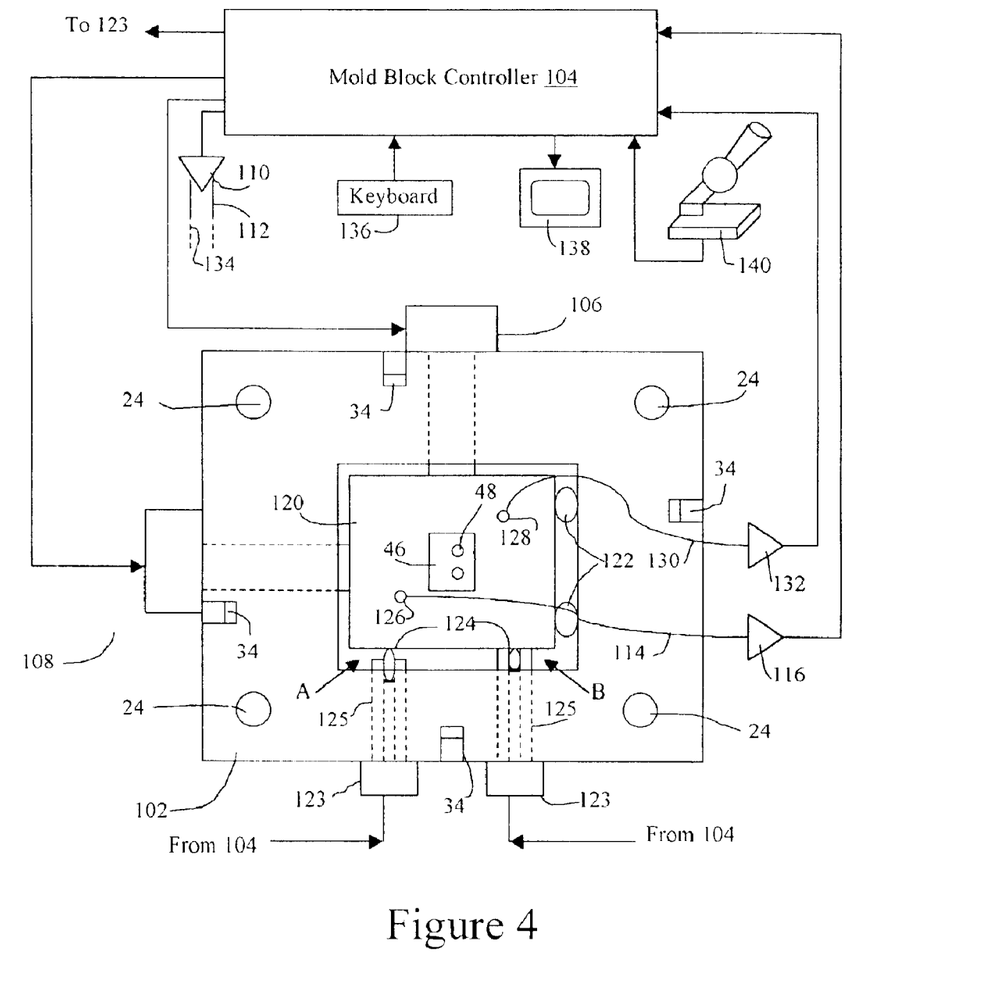
FIG. 4 is a highly diagrammatic view in elevation of one-half of a mold set for molding precision articles as well as positional control devices and computer-based control elements in accordance with an automatic adjustment embodiment of the present invention.

Turning to FIG. 4, the improved mold half 102 is shown. Therein, a micro-positionable cavity block 120 holding die insert 46 is positioned within a cavity of the mold half 102 against resilient means or members. In the example of FIG. 4, compression springs 122 bias the cavity block 120 in the x-dimension, while compression springs 124 bias the cavity block 120 in the y-dimension. Actuator 108 applies an x-dimension precision displacement force to the cavity block 120 against the spring bias force provided by springs 122, while actuator 106 applies a y-displacement precision displacement force to the cavity block against the spring bias force applied by springs 124.

In the example presented in FIG. 4, two optical alignment orifices 126 and 128 are provided, preferably on opposite sides of the mold insert 46. The alignment orifice 126 receives optical fiber 114 as previously explained. The other optical alignment orifice 128 receives an optical fiber 130 which leads to a second opto-electronic detector 132 providing light intensity information to the controller 104. A second suitable light source directs a second light beam at the orifice 128 and fiber 130 from the mold block in the fixed mold half 16. The second light source may be a separate electro-optic transmitter and fiber, or a second fiber 132 extending from a beam splitter of the electro-optic transmitter 110, for example.

The molding machine 100 shown in FIGS. 3 and 4 is capable of being operator programmed to operate automatically. In an automatic operational mode, when the mold is closed in a molding cycle, relative position of the mold blocks is sensed optically, and position is corrected, if necessary, before injection of amorphous plastic-phase material to be molded.

Alternatively, because of potential tolerances of the mold insert 46 within the mold block, it may be desirable to run a test cycle, measure the molded test article with a microscope or optical comparator 140, and cause measured offsets or tolerances to be sent to the controller 104 via keyboard 136 manually, or automatically from the optical inspection station 140. The controller 104 then determines positional corrections (e.g., by calculation, table look-up, or other known techniques) and applies the corrections to the actuators 106 and 108, for example. A display 138 may be provided to display position correction values being applied to the actuators 106 and 108 and/or other information concerning operation of the mold 100.

While the controller 104 has been described as dedicated to the correction of cavity block relative position in the ±one micron tolerance range, those skilled in the art will appreciate that the function of controller 104 may be a subset of functions of a mold machine digital controller and be implemented by software programming into an existing controller as modified to receive sensed position information and put out actuator control values to micro-actuators 106 and 108, for example. Positional offset correction may be carried out as a single operational step or event, or it may be carried out as a series of incremental adjustments. The positional correction may be carried out in accordance with a correction algorithm designed for the particular molding apparatus and its components and tolerances, or it may be carried out heuristically by making molded test articles and developing correction tables based on manual or robotic-based automatic inspection and measurements of the molded test articles.

Figure 5:
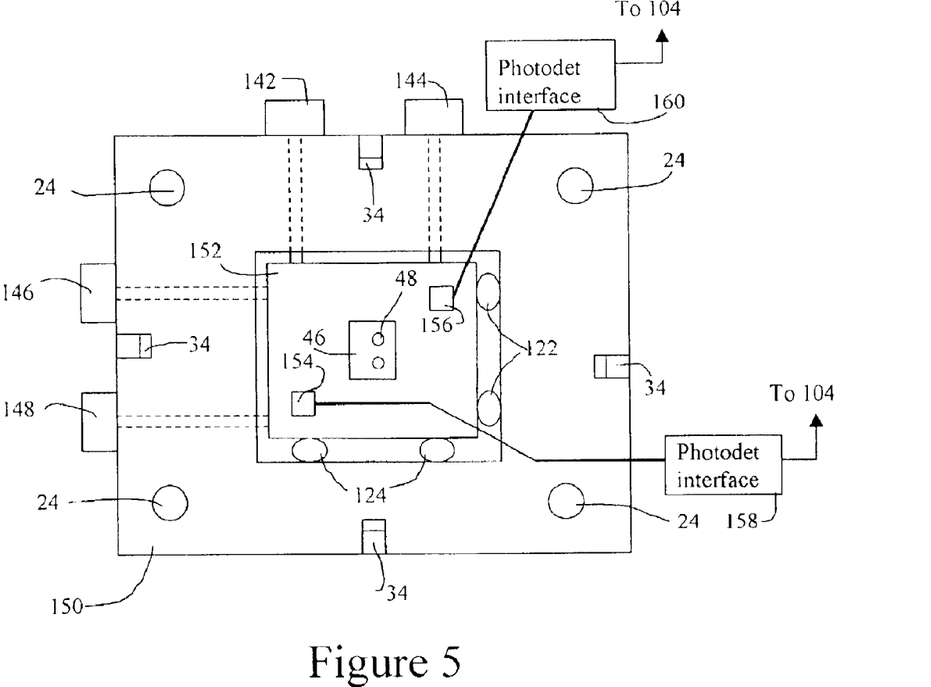
FIG. 5 is a highly diagrammatic view in elevation of one-half of a mold set for molding precision articles wherein positional sensing and control devices enable adjustment of the mold insert in at least two lineal dimensions and one rotational dimension.
Figure 6:
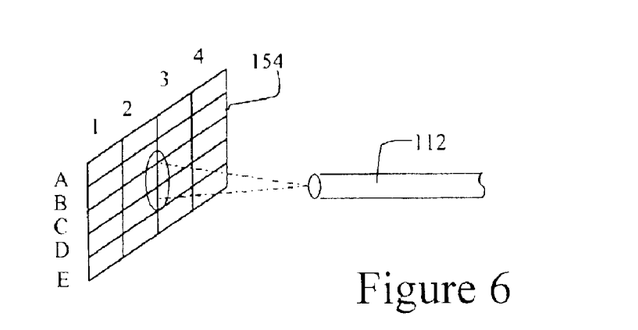
FIG. 6 is a highly diagrammatic view of a sensor of the type shown in the FIG. 5 example wherein a photodetector matrix of one mold insert is illuminated by laser light from an optical fiber directed from the other mold insert.

While two electromechanical actuators 106 and 108 have been illustrated, those skilled in the art realize that a single actuator, or three or more actuators, may be provided to achieve desired manipulation and positional correction of the moveable cavity block within one of the mold halves. In the example of FIG. 5, mold block 150 has four precision micro-actuators. Actuators 142 and 144 position a cavity block 152 generally in the y-dimension, while actuators 146 and 148 position cavity block 152 generally in the x-dimension. By separately controlling actuator pairs 142–144 and 146–148 a range of precision rotational displacement may be applied to the cavity block 152. In order to support precision rotational displacement of cavity block 152 two multi-element photodetector matrix arrays 154 and 156 are provided. FIG. 6 illustrates one array 154 having rows (labeled by letters) and columns (labeled by numbers) of separate photodetector elements. Photodetector matrix array 154 is electrically coupled to a photodetector interface circuit 158, and photodetector matrix array 156 is electrically coupled to a photodetector interface circuit 160. The circuits 158 and 160 translate electrical signals representing illumination energy into digital values indicative of the particular photodetector element(s) receiving optical energy from the optical fiber of the other cavity block. These digital values are then sent to the controller 104 for processing to determine correction values to be applied to the actuator pairs 142–144 and 146–148. In the FIG. 6 example, light energy from the fiber 112 is impinging at different energy levels on photodetector elements located at row B, columns 2 and 3; row C, columns 2 and 3; and row D, columns 2 and 3. By measuring relative light energy amplitudes from multiple detector elements the molding system controller can command precision corrections over lineal and rotational adjustment ranges in the ±one micron range or better, depending upon the selected resolution of the detectors 154, 156 and actuator pairs 142–144 and 146–148. The multi-element matrix detectors 154 and 156 provide an advantage over the single detector elements 126 and 128 in that detected peak optical amplitude at a particular element of an array may provide a more accurate mold block position measurement than a measurement based upon detected peak optical amplitude at a single photodetector.

The precision micro-actuator may apply linear or rotational force to the mold block. The actuator may correct for planar offset or rotation or tilt, as need be. The actuator may be a micro-step stepping motor rotating a finely threaded screw, a servo motor rotating a finely threaded screw, a piezo-electric device, a bi-metal thermal control device, a fluidic actuator (either hydraulic or pneumatic), a linear electric motor such as a solenoid or voice coil motor, a wedge-shaped or ramped sliding mechanism having a fixed part and a displaceable part, or any other known electromechanical device capable of applying a precise force over a very small dimension to reposition the cavity block in the micron range.

The resilience means for applying a positional bias force to the cavity block, illustrated as spring sets 122 and 124, may be provided by any resilient or elastomeric component or material which is found suitable for the particular molding process or article to be formed. Leaf springs, coil springs, rubber springs, pneumatic compression springs, and the like may be employed to apply spring bias force to the positionable cavity block component.

Alternatively, a displaceable stop may be used in place of, or in conjunction with the bias spring 124 (and/or 122). In a preferred approach illustrated in FIG. 4, the bias spring 124 may be a coil spring seated in a cylindrical end well of a threaded shaft 125 having fine pitched threads mating with threads formed in the mold half 102. The bias spring 124 provides a bias force against the cavity block 120 during the position adjustment step, as shown in FIG. 4 at reference character A. Once the cavity block 120 is precisely positioned, the threaded shaft 125 is moved into fixed contact with the cavity block 120, thereby locking it securely in position to obtain the desired molding tolerance during the molding operation, as shown in FIG. 4 at reference character B. The threaded shaft 125 may be rotated by a step motor 123, micrometer, or other suitable manual or computer-controlled mechanism. Some or all of the bias springs 122, 124 may include displaceable stop mechanisms as may be needed to lock the cavity block 120 in place. Alternatively, a displaceable stop which is structurally separate from the bias springs 122, 124 may be used to lock the cavity block 120 in place following the adjustment step (e.g., threaded shaft 210 in the FIG. 8 embodiment).

The position sensing means, illustrated as optical fibers and associated transmitters and detectors or detector arrays in the preferred embodiments, may be provided in a number of ways. Focused light from an emitting optical device accurately affixed to a fixed (or moving) mold component may be directed to impinge on an optical pickup device accurately affixed to a moving (or fixed) mold component to provide positional alignment feedback information. An optical encoder array of a light source, reticle, micro-lined scale and photodetector array may be used as these components. The optical pickup device may be a single fiber, or a bundle of fibers, with each fiber leading to a separate photodetector element, or to a photodetector array. Light intensity or light position may be used to indicate relative offset of the mold block components. Any transmissive or reflective positional sensing technology having accuracy in the desired range may be employed to sense position of the adjustable cavity block component relative to the fixed cavity block component.

Figure 7:
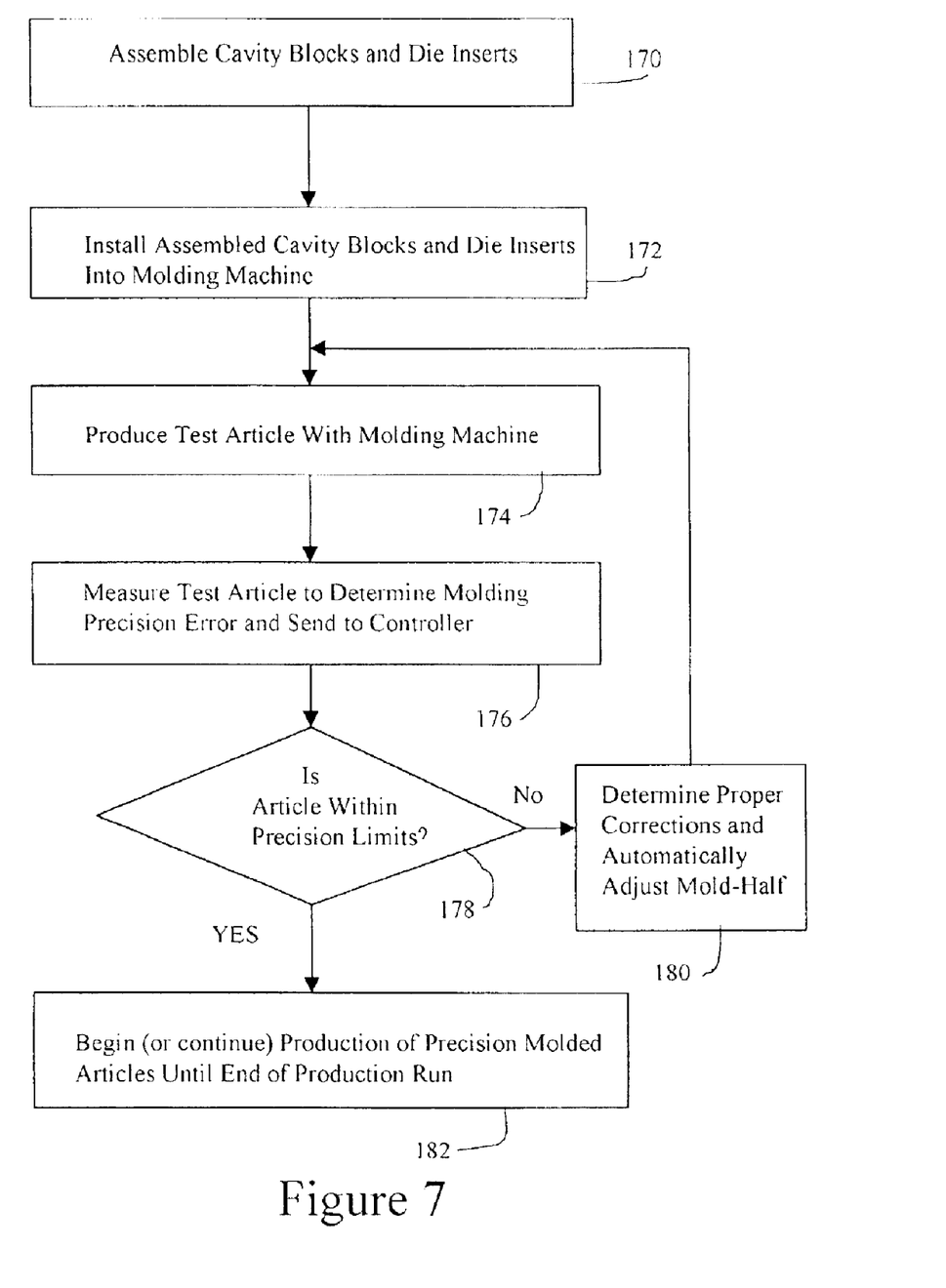
FIG. 7 is a flow chart of steps followed in practicing method of the present invention.

An automated measurement and adjustment method to enable a precision molding process in accordance with aspects of the present invention is outlined in the FIG. 7 flow chart. Cavity blocks having suitable molding features or die inserts are installed in mold halves and the spring sets 122 and 124 are installed or otherwise brought into position against one cavity block 120 to provide positional bias force, at a step 170. Assembled mold halves 102 and 16 are installed on the molding machine 100 at a step 172. The molding machine is operated at a step 174 to provide a test article. The test article is measured at the inspection station 140 to measure positional inaccuracies in the test article and provide these inaccuracies to the controller 104 at a step 176. If out-of-specification tolerances are determined to be present, at logical step 178, the controller 104 determines positional corrections and applies the corrections automatically to actuators 106 and 108 at a process step 180. Process flow returns to step 174 and a subsequent test article is made. When measurements at the inspection station 140 determine that desired positional accuracy has been achieved as determined at logical step 178, the adjustment process ends, and production of precision molded articles may then commence at step 182 and continue as desired until production has been completed.

While the automatic measurement and adjustment process is always carried out at the beginning of a production run, it may be carried out continuously or at suitable intervals during molding operations, to be sure that molded articles remain precise throughout the production run.

Figure 8:
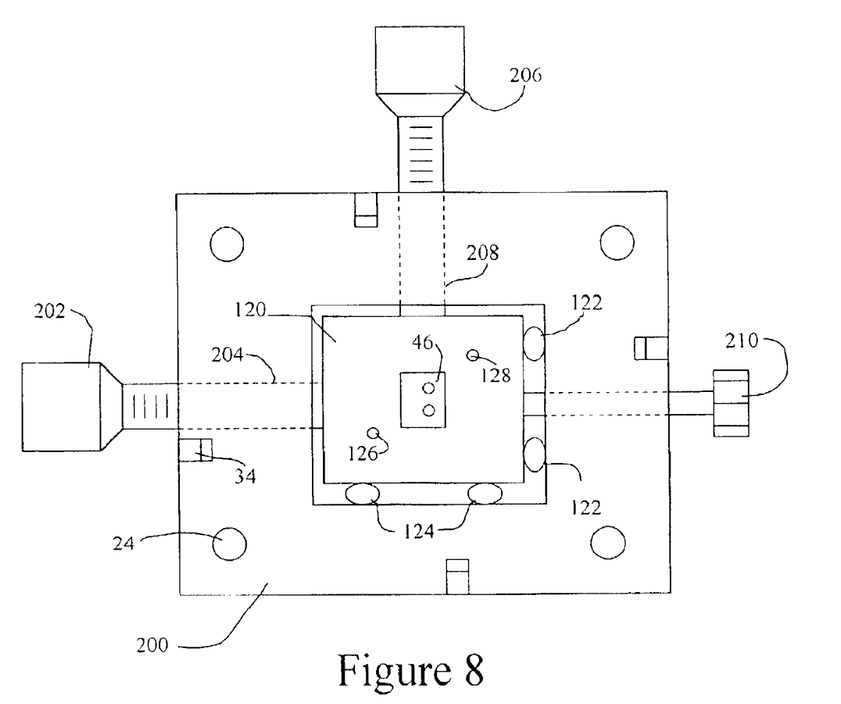
FIG. 8 is a view in elevation of one-half of a mold set for molding precision optical components in accordance with a manual adjustment embodiment of the present invention.

Turning now to FIG. 8, a mold block half 200 is shown which enables manual adjustment of the cavity block 120. In this example of the present invention, an x-dimension micrometer 202 having a calibrated adjustment knob external to the mold block half 150 enables manual rotation of a shaft 204 thereby providing a displacement force to the cavity block 120 in the x-dimension against spring bias force applied by springs 122, for example. A y-dimension micrometer 206 having a calibrated adjustment knob external to the mold block half 150 enables manual rotation of a threaded shaft 208 thereby providing a displacement force to the cavity block 120 in the y-dimension against spring force applied by springs 124, for example. A displaceable stop to lock the cavity block 120 in place following manual position adjustment may be provided by a threaded bolt 210. The bolt 210 may be provided in the x-dimension, the y-dimension, or two bolts 210 may be provided to lock the cavity block 120 in both x and y dimensions.

In connection with the FIG. 8 embodiment, optical position sensing may be employed via optical orifices 126 and 128 as described in connection with FIGS. 3 and 4 above, or with mult-element photodetector matrix arrays 154 and 156 as described in connection with FIGS. 5 and 6 above. Alternatively, manual tolerance measurements of molded test articles may be made, and cavity block adjustments manually entered at micrometers 202 and 204 to reduce tolerances to the ±one micron range.

Having thus described preferred embodiments of the invention, it will now be appreciated that the objects of the invention have been fully achieved, and it will be understood by those skilled in the art that many changes in construction and widely differing embodiments and applications of the invention will suggest themselves without departing from the spirit and scope of the invention. Therefore, the disclosures and descriptions herein are purely illustrative and are not intended to be in any sense limiting.

What is claimed is:

1. A method for improving positional accuracy of a moveable mold component relative to a fixed mold component of precision article molding apparatus, comprising steps of:
   a. sensing alignment of the moveable mold component relative to the fixed mold component to produce a positional offset value, and
   b. positionally displacing one of the moveable and fixed mold components by applying a displacement force with an adjustment mechanism against a displaceable bias force providing means of the molding apparatus without disassembly of the mold components to reduce the positional offset value in a range of 10 microns or less.

2. The method set forth in claim 1 wherein the step of sensing alignment is carried out with a position sensor responsive to positional orientation of the moveable mold component relative to the fixed mold component.

3. The method set forth in claim 2 wherein the step of sensing alignment is carried out with an optical position sensor.

4. The method set forth in claim 3 wherein the step of sensing alignment is carried out with a plurality of optical sensors.

5. The method set forth in claim 4 wherein the step of sensing alignment is carried out with a plurality of multi-element matrix photodetector arrays.

6. The method set forth in claim 1 comprising the further steps of inputting the positional offset value to a mold controller means, calculating with the mold controller means a mold component correction value from the positional offset value and automatically applying the mold component correction value to an electromechanical adjustment mechanism within a feedback control loop to cause automatic reduction of the positional offset value.

7. The method set forth in claim 6 carried out iteratively in order to reduce the positional offset value incrementally.

8. The method set forth in claim 6 carried out in accordance with a positional correction algorithm.

9. The method set forth in claim 6 carried out heuristically in accordance with data obtained by molding test articles, measuring tolerance errors and correcting measured tolerance errors.

10. In an injection molding apparatus for precision molding articles of thermoplastic material, the molding apparatus including a molding assembly having a moveable mold part and a fixed mold part, a force imparting mechanism for forcing the moveable mold part against the fixed mold part during a molding cycle and for thereafter retracting the moveable mold part from the fixed mold part, and an injection system for injecting thermoplastic material during the molding cycle into a precision molding cavity defined by adjacent faces of the moveable mold part and the fixed mold part of the molding assembly, an improvement comprising:
an adjustable mold component and a fixed mold component, for molding said articles,
a bias force providing means for applying a bias force to the adjustable mold component,
an adjustable mold component fine position adjustment means operable exteriorly of the mold for applying a position adjustment force to the adjustable mold component to overcome the bias force and thereby adjust position of the adjustable mold component relative to a fixed mold component to reduce positional offset in at least one adjustment dimension.

11. The improvement in injection molding apparatus set forth in claim 10 wherein said bias force providing means comprises at least one spring.

12. The improvement in injection molding apparatus set forth in claim 10 wherein said bias force providing means comprises a displaceable stop.

13. The improvement in injection molding apparatus set forth in claim 10 wherein said bias force providing means comprises a spring in combination with a displaceable stop.

14. The improvement in injection molding apparatus set forth in claim 10 further comprising a plurality of bias force providing means for providing bias forces to the adjustable mold component in a plurality of adjustment dimensions, and a plurality of mold position fine adjustment means for adjusting position of the adjustable mold component in said plurality of adjustment dimensions.

15. The improvement in injection molding apparatus set forth in claim 10 wherein the molding assembly comprises at least one positional offset sensor means for sensing positional offset of the adjustable mold component relative to the fixed mold component in said at least one dimension.

16. The improvement in injection molding apparatus set forth in claim 15 wherein the positional offset sensor means comprises electro-optical position sensing means including a light source and a detector.

17. The improvement in injection molding apparatus set forth in claim 15 wherein the positional offset sensor means comprises at least one photodetector matrix array.

18. The improvement in injection molding apparatus set forth in claim 17 comprising a plurality of photodetector matrix arrays for sensing positional offset of the adjustable mold component relative to the fixed mold component in a plurality of dimensions.

19. The improvement in injection molding apparatus set forth in claim 15 wherein said adjustable mold component fine position adjustment means comprises an electromechanical fine position adjustment means, and further comprising a feedback control loop including controller means connected to the positional offset sensor means and to the electromechanical fine position adjustment means, the controller means being responsive to sensed positional offset for calculating a fine position correction value and for applying the fine position correction value to operate said electromechanical fine position adjustment means to reduce sensed positional offset in said at least one dimension.

20. The improvement in injection molding apparatus set forth in claim 19 wherein said fine position adjustment means comprises first and second electromechanical fine position adjustment means for adjusting the adjustable mold component in at least two separate dimensions, and wherein the controller means is connected to the first and second electromechanical fine position adjustment means and calculates and applies position correction values to operate the first and second electromechanical fine position adjustment means.

21. The improvement in injection molding apparatus set forth in claim 10 wherein the adjustable mold component fine position adjustment means comprises a manually operable micrometer.

22. The improvement in injection molding apparatus set forth in claim 10 wherein the adjustable mold component fine position adjustment means comprises a threaded shaft rotated by an electrical motor.

23. The improvement in injection molding apparatus set forth in claim 10 wherein the adjustable mold component fine position adjustment means comprises a piezoelectric device.

24. The improvement in injection molding apparatus set forth in claim 10 wherein the adjustable mold component fine position adjustment means comprises an electrically controlled fluidic pressure device.

25. The improvement in injection molding apparatus set forth in claim 10 wherein the adjustable mold component fine position adjustment means comprises an electrically operable bi-metal device.

26. The improvement in injection molding apparatus set forth in claim 10 wherein the adjustable mold component fine position adjustment means comprises a linear electric motor.

27. The improvement in injection molding apparatus set forth in claim 10 wherein the adjustable mold component fine position adjustment means comprises a wedge-shaped slide mechanism.

28. A mold block for use in a precision injection molding apparatus having an opening-closing axis, the mold block defining a generally rectangular box-shaped cavity, a cavity block having a plurality of spatially separated precision features on an outer surface and being located in the cavity and biased in at least one dimension normal to the opening-closing axis by displaceable bias force providing means, and a precision force-providing device operable exteriorly of the mold block for precisely positioning the cavity block in the cavity by displacing the block against the displaceable bias force means in at least one lineal adjustment dimension.

29. The mold block set forth in claim 28 comprising a plurality of displaceable bias force providing means and a plurality of precision force-providing devices for precisely positioning the cavity block in at least two lineal dimensions.

30. The mold block set forth in claim 29 wherein the plurality of displaceable bias force providing means and the plurality of precision force-providing devices are arranged to provide rotational displacement, and lineal displacement in at least two lineal dimensions, to the cavity block.

31. The mold block set forth in claim 28 further comprising cavity block position sensor means enabling sensing of position of the cavity block relative to the mold block.

32. Mold apparatus for precision molded components comprising:

a first mold half defining at least two spatially-offset component first precision features, a second mold half defining at least two spatially-offset component second precision features to be formed in said component in alignment with said first precision features, a mold frame for mounting and coarsely aligning said first mold half with said second mold half and for guiding said first mold half and said second mold half together along a longitudinal mold closure axis, a fine position adjustment mechanism registered to, and operable exteriorly of, said mold frame for providing a fine position lineal adjustment of one relative to the other of said first mold half and said second mold half within an adjustment plane, the adjustment plane being substantially perpendicular to the longitudinal mold closure axis.

33. The mold apparatus set forth in claim 32 within an injection molding machine.

34. The mold apparatus set forth in claim 32 wherein said fine positional adjustment mechanism is arranged to apply a rotational displacement as well as a lineal displacement relative to said mold closure axis.

35. The mold apparatus set forth in claim 32 wherein said fine positional adjustment mechanism is arranged to apply a tilt displacement as well as a lineal displacement relative to said mold closure axis.

36. The mold apparatus set forth in claim 32 wherein the adjustment mechanism includes position sensing means for sensing a positional offset between the first mold half and the second mold half, information processing means receiving the positional offset and for generating a correction value, and actuator means receiving the correction value for providing said fine positional adjustment.

37. The mold apparatus set forth in claim 32 wherein the positional adjustment mechanism includes operator adjustment means enabling manual fine position adjustment.

38. The mold apparatus set forth in claim 32 wherein the mold frame includes displaceable bias force imparting means against which the fine position adjustment mechanism displaces said one to provide the fine position lineal adjustment between the first mold half and the second mold half.

39. The mold apparatus set forth in claim 38 wherein the first mold half is adjusted by the fine position adjustment mechanism and wherein the resilient bias force imparting means comprises a plurality of compressible springs located along a wall of the first mold half and an oppositely facing wall of one half of the mold frame containing the first mold half.

* * * * *